July 16, 1929.  L. V. CASTO  1,720,719
METHOD OF AND APPARATUS FOR MAKING TRANSFER ROLLS
Filed Feb. 16, 1927

Inventor
Lloyd V. Casto
By Bates, Macklin, Gobrick & Pearl
Attorney

Patented July 16, 1929.

1,720,719

UNITED STATES PATENT OFFICE.

LLOYD V. CASTO, OF DETROIT, MICHIGAN, ASSIGNOR TO OXFORD VARNISH CORPORATION, OF DETROIT, MICHIGAN, A CORPORATION OF MICHIGAN.

METHOD OF AND APPARATUS FOR MAKING TRANSFER ROLLS.

Application filed February 16, 1927. Serial No. 168,610.

This invention is concerned with the method of and an apparatus for the forming of transfer rolls such as are used in rotary printing, etc., and has for its general object the provision of a novel manner for placing the gum or resilient surfacing material on a core in such way as to cause the material to thoroughly adhere to the core surfaces and to prevent the formation of pits and interstices in the cylindrical surface of the rolls.

A further object of my invention is to provide an apparatus for effecting the various steps of my novel method of making transfer rolls.

Other objects of my invention will be hereinafter set forth in the following description given in connection with the accompanying drawings, illustrating a preferred form of apparatus for carrying out my process of making gum rolls. The essential characteristics are summarized in the claims.

Figure 1:
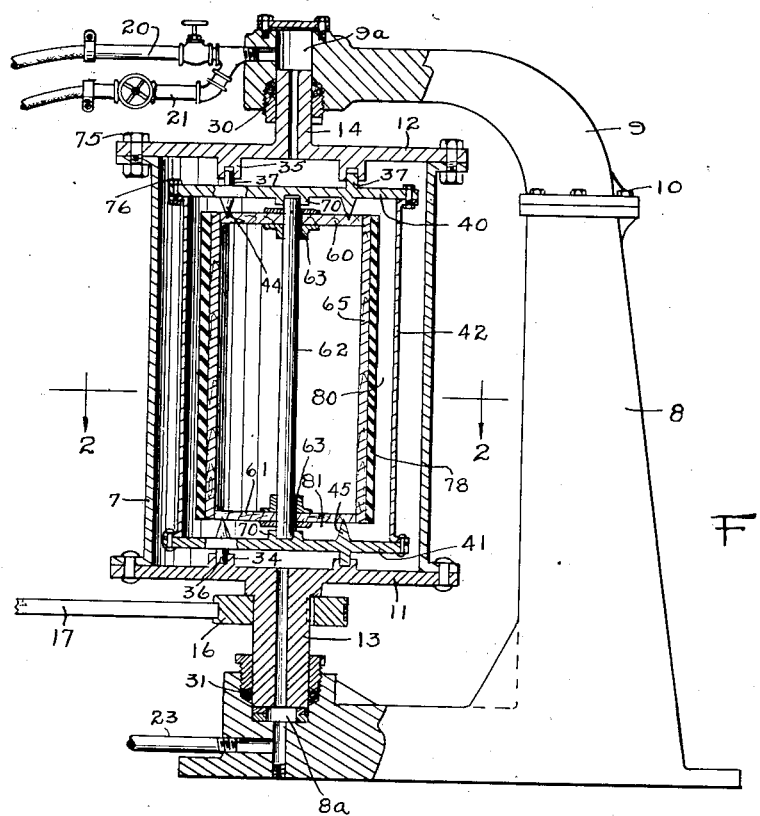
Figure 2:
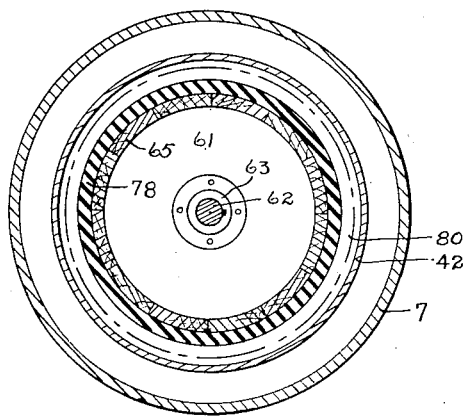

In the drawings Fig. 1 is a cross sectional elevation of an apparatus adapted to make or form rolls by my process; Fig. 2 is a cross sectional view taken substantially along the lines 1—1 of Fig. 1.

Inking rolls and transfer rolls are usually formed of gutta-percha, glucose and other materials which are in a fluid condition at raised temperatures, and which under normal temperatures, solidify but remain resilient. Such rolls are usually formed by placing the core in a mold and casting the gum material while in a fluid state about the core. It frequently happens, however, that such a method results in the formation of small pockets and pits in the ink or pigment receiving surfaces of the rolls due to the entrapping of air bubbles in the molding process.

My invention contemplates the use of a rotary mold adapted to receive a core of any desired dimension. The gum material is poured into the mold in a warm, fluid state and the mold is rotated at sufficiently high speed to cause the air bubbles to travel inwardly toward the center of the core and away from the surface of the gum material.

In the drawings I show a mold mounted for rapid rotation and in the mold I show a core of hollow construction and provided with a resilient covering, such as sponge rubber, but it is to be understood that the present invention is useful in forming gum rolls not provided with a rubber cushion embodied in the core. In Fig. 1 I show the apparatus as comprising a standard or base 8, which rotatively supports a steam and water jacket 7. The base 8 is provided at its upper end with a removable bearing arm 9. The bearing arm 9 can be attached to the base portion 8 in any suitable manner to permit its removal, and I show merely bolts 10 securing the arm 9 to the base 8. The jacket structure 7 is provided with end disk members 11 and 12, having extensions 13 and 14 respectively, which constitute in effect a shaft for vertically and rotatively supporting the mold and core within the jacket. The base, as shown at 8ª is provided with a suitable bore to form a mold bearing and the arm 9 is provided with a similar bore 9ª to form a suitable bearing for the upper shaft portion 14 of the jacket 7. Any form of driving means, for example, a pulley 16 may be rigidly mounted on the jacket 7 whereby the jacket may be rotated from a source of power through a belt member 17.

The shaft portions 13 and 14 of the jacket member 9 are hollow to provide a conduit for the ingress and egress of steam and water to the jacket 7, whereby the temperature of the rotatable portion of the apparatus may be controlled, and accordingly I provide a steam line 20 and a water line 21 in connection with the arm 9 for this purpose. These pipe lines may be connected to flexible conduits 20ª and 21ª to facilitate the removal of the arm 9. The condensed steam or water in the jacket 7 may escape through the line 23 attached to the base member 8.

Suitable packing glands 30 and 31 are provided to engage the portions 13 and 14 respectively, to prevent leakage when fluid is being run into the jacket 7.

The end portions 11 and 12 of the jacket 7 are provided with inwardly extending hollow lugs 34 and 35, which are adapted to engage lug members 36 and 37 respectively, and which are formed on the end members 40 and 41 of the mold member 42, the diameter of the mold member being such as to provide space between the jacket 7 and the mold wall. The end members 40 and 41 of the mold member are also provided with lugs and in the present illustration pointed lugs 44 and 45 which are adapted to engage or imbed in wooden end portions 60—61 of the core structure.

The core structure may comprise a shaft 62 provided with flange members 63, which secure the end disks 60 and 61 to the core shaft. The end disk members have attached thereto wooden staves or slats 65 to form the cylindrical portion of the core. Formed upon and extending inwardly from the end mold members 40 and 41 are bearing portions 70 and 71, which are suitably bored to receive the projecting ends of the core 62.

The end jacket member 12 may be removably secured to the cylindrical portion of the jacket structure 7 by any suitable means, such as bolts 75, to permit the removal of the mold member 42, and the end mold member 40 is likewise secured to the cylindrical portion 42 thereof by any suitable means such as bolts 76, whereby the core structure may be placed within the mold member and be removed therefrom after the roll is completely formed.

As shown in the present drawings, the core structure is provided with a sponge rubber covering 78 and the molding of the gum material takes place in the annular space 80.

The mode of procedure in forming a roll in accordance with the present invention is as follows:—

The core structure is first made in a well known manner and of proper diametric proportion to permit of the forming thereon of the desired thickness of gum material, and the core is placed within a mold of an internal diameter corresponding to the desired outer diameter of the roll. A proper quantity of fluid gum material, mixed in accordance with any suitable or well known formula, is then poured into the mold member. The end mold member 40 is then bolted to the cylindrical portion of the mold structure, the connection being such as to prevent any leakage of the liquid gum material when the apparatus is rotated. The mold member is then placed within the jacket 7, and the end member 12 thereof is bolted thereto. The arm is then brought into engagement with the shaft portion 14 of the jacket 7 and bolted, as at 10, to the base 8. Power is applied to rotate the jacket 7 and steam is run through the line 20 into the jacket. After a few minutes of rotation, the steam is turned off and water run through the line 21 of the jacket 7. In the meantime rotation of the apparatus is maintained and the air bubbles, which ordinarily form on the inner surface of the cylinder portion of the mold member, are caused to float inwardly toward the core structure. This is caused by centrifugal force tending to force the more dense gum material outwardly. A compression of the gum material while in liquid form is also brought about and this compression is effected by the centrifugal force set up by the liquid in the space 81 present between the lower end of the core and an end of the mold member.

When a cushion or sponge rubber covering 78 is placed on the core member the compressing action of the fluid gum material tends to compress the sponge rubber material. This compression is maintained and cold water passing through the jacket brings about solidification of the gum material while the sponge rubber remains compressed.

It is apparent that my method of and apparatus for forming gum rolls is adaptable to rolls of varying diameters and lengths, it only being necessary to vary the structural lengths of the jacket members and mold members, and to use a spacer on the base 8 between the connection thereof to the arm connection 9.

I claim:—

1. The method of making resilient transfer rolls which includes the steps of constructing a rigid core having a sponge rubber covering, inserting the core in a rotatable mold with a space at one end of the core, placing an excess quantity of solidifiable gum material in the mold about the core while in liquid condition, and subjecting the core and mold to a rotary movement about the axis thereof to cause the gum material to be maintained under pressure and in contact with the rubber coating until said gum material solidifies about the cylindrical surface of the rubber coating.

2. The method of making resilient transfer rolls which includes the step of constructing a rigid core, inserting the core in a rotatable mold with open spaces at each end of the core, placing an excess quantity of solidifiable gum material in the mold about the core while in liquid condition, and subjecting the core and mold to a rotary movement about their own axis while maintaining the gum material in liquid condition by controlling its temperature and thereafter causing it to solidify against the cylindrical surface of the mold and core by lowering its temperature.

3. The method of making gum transfer rolls, which includes the step of placing a hollow core having a resilient covering within a cylindrical mold with a uniform space maintained between the outer cylindrical surface of the core and the inner cylindrical surface of the mold, the mold containing an excess quantity of gum material in liquid state to completely fill said uniform space, and maintaining the rotation of the mold and the core at a sufficiently high speed to cause the liquid gum material to compress the resilient covering of the core, and as the gum material solidifies.

4. The method for making transfer rolls, which includes the compressing of gum material about a core having a resilient covering upon which it is to congeal and controlling the temperature of the gum material while it is under pressure to cause it to solidify with the resilient covering of the core maintained in compressed condition.

5. The method of solidifying gum material upon the cylindrical surface of a core therefor, which comprises whirling the core and the gum material in a closed cylinder about the axis of the cylinder while providing a superfluity of gum material at one end of the core whereby centrifugal force will maintain a uniform pressure upon the liquid throughout its contact with the cylindrical core surface and the surface of the enclosing cylinder to prevent the formation of air bubbles.

6. The method of solidifying gum material upon the cylindrical surface of a core having a resilient covering which comprises whirling the core and the gum material in a closed cylinder while providing a superfluity of gum material at one end of the core whereby centrifugal force will maintain a uniform pressure upon liquid throughout its contact with the resilient core covering and the surface of the enclosing cylinder and thus cause partial compression of the resilient core covering.

7. In an apparatus of the character described the combination of a cylindrical mold member having associated therewith means for suspending a core therein in coaxial relation therewith, a rotatable jacket for supporting and rotating the cylindrical mold member, means for rotating said jacket and means for rotatably supporting the jacket.

8. In an apparatus for placing gum material upon a core to form a resilient transfer roll, the combination of a cylindrical mold having means for coaxially positioning the core therein, means for supporting and rotating the cylindrical member and means for regulating the temperature of the mold member.

9. In an apparatus of the character described the combination of a cylindrical mold member having associated therewith means for suspending a core therein in coaxial relation therewith, a rotatable jacket for supporting a cylindrical mold member, means for rotating said jacket, means for rotatably supporting the jacket and means associated with the last named means for controlling the temperature of the mold member.

10. In an apparatus for placing gum material upon a core to form a resilient transfer roll, the combination of a cylindrical mold having means for coaxially positioning the core therein, means for removably supporting and for rotating the cylindrical member and an outer cylinder-surrounding temperature control jacket.

11. In an apparatus of the character described the combination of a cylindrical mold member having associated therewith a means for suspending a core therein in coaxial relation therewith, a rotatable jacket for supporting the cylindrical mold member, means for rotating said jacket and means for controlling the mold temperature.

12. In an apparatus of the character described, the combination of a cylindrical mold member adapted to support a core therein in spaced relation thereto, means for causing pressure to be exerted upon liquid gum material placed between the core and mold wall, a jacket surrounding the mold member and means for controlling the temperature of the mold member.

In testimony whereof, I hereunto affix my signature.

LLOYD V. CASTO.